United States Patent Office 3,838,150
Patented Sept. 24, 1974

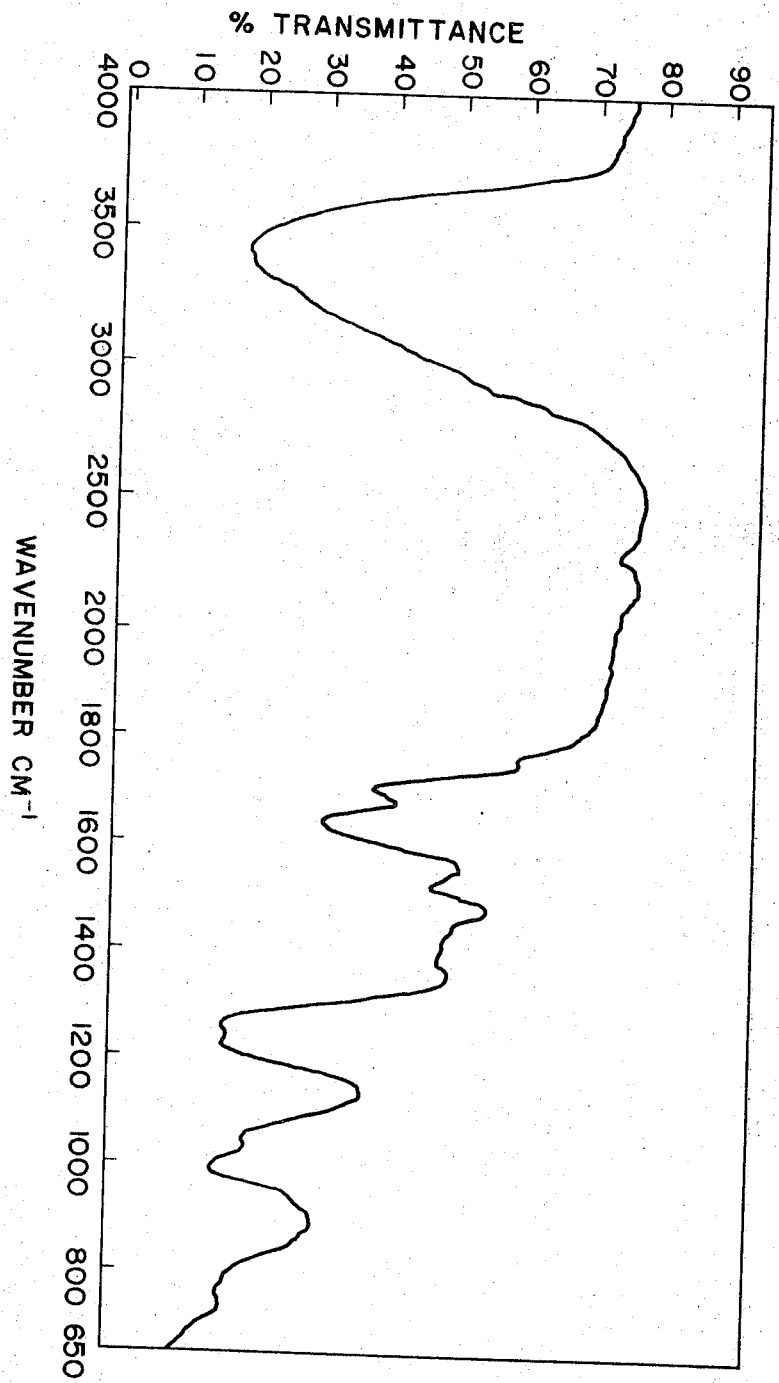

3,838,150
DISACCHARIDE POLYSULFATE ESTER HYDROXYALUMINUM ALLANTOINATE-ALUMINUM COMPLEX AND PROCESS FOR PREPARING SAME
Mamoru Sugiura, Konan, and Tadashi Kitamikado and Kazuo Kato, Nagoya, Japan, assignors to Maruko Seiyaku Kabushiki Kaisha, Nagoya-shi, Aichi-ken, Japan
Filed June 23, 1972, Ser. No. 265,519
Claims priority, application Japan, July 6, 1971, 46/49,270
Int. Cl. C07c 69/32
U.S. Cl. 260—234 R
4 Claims

ABSTRACT OF THE DISCLOSURE

Novel antiulcer agents, comprising a disaccharide polysulfate ester hydroxyaluminium allantoinate-aluminium complex is produced by the steps of: reacting an alkaline salt of a disaccharide polysulfate ester with chlorhydroxy aluminium allantoinate and thereafter reacting the resulting compound with aluminium hydroxychloride or aluminium dihydroxychloride.

---

This invention relates to a novel antiulcer agent and a process for manufacturing the same. More particularly, it is concerned with a novel antiulcer agent, comprising a disaccharide polysulfate ester hydroxyaluminium allantoinate-aluminium complex, hereinafter designated as the SSA–A1–219 substance, and a process for its production.

It has heretofore been reported that aluminium allantoinate has been used as an antipeptic ulcer substance having granulation tissue formation activity which is effective for removal of necrotic tissue, and possesses antipeptic activity and antacid action. Furthermore disaccharide polysulfate aluminium compounds have been applied as antipeptic ulcer agents, having antipeptic activity, a protective effect for the gastric mucosa and antacidic activity.

We have successfully prepared a novel antiulcer agent by the process comprising reacting a disaccharide polysulfate ester alkaline salt with chlorohydroxy aluminium allantoinate in an amount corresponding to 1–2 equivalents of sulfate in the former compound, and thereafter additionally reacting the residual 2–5 equivalent of sulfate with the aluminium hydroxychloride or aluminium dihydroxychloride.

An object of the present invention is to provide a novel antiulcer agent without decreasing the characteristics of aluminium allantoinate or disaccharide polysulfate ester aluminum compound.

A further object of this invention is to provide a process for production of novel antiulcer agents which have been designated as SSA–A–219, i.e. disaccharide polysulfate ester hydroxy-aluminium allantoinate-aluminium complex.

According to an embodiment of the present invention, a disaccharide polysulfate alkaline salt is dissolved or mixed with a suitable solvent, such as, water, aqueous methanol, methanol or the like, chlorhydroxy aluminium allantoinate [$ClAl_2(OH)_4$—$C_4H_3N_4O_3$] in the form of crystal or aqueous suspension is added in an amount of 1–2 equivalents to a sulfate radical, and thereafter adding 2–5 equivalents of aluminium hydroxychloride

[$ClAl_2(OH)_5$]

or 4–10 equivalents of aluminium dihydroxychloride

[$ClAl(OH)_2$]

in the form of crystals or an aqueous solution. The precipitate thus formed is collected by filtration as it is or filtered after adding a water miscible organic solvent, such as, methanol, isopropylalcohol or the like, and washing the precipitate with water and methanol to obtain the product in high yield. When the aluminium dihydroxychloride is used, the pH of the reaction mixture may preferably be adjusted to pH 4.0–4.5 by adding an alkaline solution.

The final concentration of the reaction mixture is preferably controlled between 10–20% and the reaction may preferably proceed at an ambient temperature.

The starting material of the present invention can be prepared by any known methods such as reacting alkaline salt of allantoin with aluminium dihydroxychloride or with aluminium chloride and adding alkaline solution thereafter [refer to U.S. Pat. No. 2,761,867].

Examples of the disaccharide polysulfate ester are preferably sucrose polysulfate ester, maltose polysulfate ester, lactose polysulfate ester or the like.

The alkaline salt of the disaccharide polysulfate can be easily prepared by the known procedures. For example sucrose, maltose, lactose or the like disaccharide is reacted with chlorosulfonic acid in the presence of pyridine as a solvent, or the said disaccharide is reacted with the sulfonation agent, such as, chlorosulfonate, sulfonic acid anhydride or the like in the presence or absence of concentrated sulfuric acid to obtain the said disaccharide polysulfate.

Aluminium hydroxychloride, another starting material of aluminium compound, may be commercially obtained or prepared by the known prior art procedure, such as, adding an alkaline solution to aluminium chloride or aluminium hydroxychloride.

Aluminium dihydroxychloride may also be easily prepared by the known process of reacting an equimolar amount of aluminium chloride and hydrochloric acid.

The thus prepared SSA–A1–219 substance has the physicochemical and biological characteristics hereinbelow.

[I] Physicochemical properties (1) Elemental analysis.—Found: C, 10–15%, H, 2.5–3.6%, N, 3–6%, S, 9–12%, Al, 14–19%.
(2) Molecular weight: 1300–2100.
(3) Melting point: Not clearly observed. Colored at about 180° C. and changes to brown at about 230° C.
(4) Infra red absorption spectrum (KBr Tablet): Shown in the Figure.
(5) Solubility: Insoluble in water and common organic solvent. Soluble in diluted hydrochloric acid. Almost soluble in diluted aqueous sodium hydroxide.
(6) Color reaction:
Aluminium reaction: positive (observed after dissolved in diluted hydrochloric acid)
Nitropursid reaction: positive
Anthron reaction: positive (observed after dissolved in diluted hydrochloric acid)
Fehling reaction: positive (observed after dissolved in diluted hydrochloric acid).
(7) Appearance: White powder.

In addition to the physicochemical nature described hereinabove, the SSA–A1–219 substance is insoluble in water contrary to the water soluble nature of the starting disaccharide polysulfate ester alkaline salt, and it contains sulfur. Furthermore, the inorganic sulfate is not detected after 4 hours heating at 105° C. The X-ray diffraction by means of powdery X-ray diffraction analysis and infra red absorption spectrum with a KBr tablet of the SSA–A1–219 substance show the completely different absorption patterns as compared with each of the starting materials and mixtures thereof.

These characteristics of the SSA–A1–219 substance hereinabove illustrated indicate that the said SSA–A1–219 substance of the present invention is a compound resulting from the replacement reaction among the disaccharide polysulfate ester alkaline salt, chlorhydroxy aluminium allantoinate and aluminium hydroxychloride or aluminium dihydroxychloride, and hence the following formula may be assigned thereto.

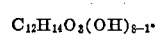

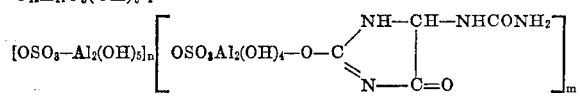

wherein l, m, and n are positive intergers, $1 = m + n$ and $l$ is a number between 0 and 8 (i.e.; $0 < 1 < 8$).

[II] Biological properties (1) Acute toxicity: The acute toxicity of the SSA–A1–219 substance per oral administration is shown in Table 1 and as is clearly observed it has almost no toxicity.

Table 1. Acute toxicity

| Dose (mg./kg.) P.O. | Number of mice observed (dead/live) |
|---|---|
| 10,000 | 0/10 |
| 5,000 | 0/10 |

Remarks: Mice: dd-strain, male, weighed 20 g. Route of administration; per oral.

(2) Experimental antiulcer activity: Table 2–4 shows the experimental antiulcer activity of the SSA–A1–219 substance in Wister strain rats. Experimental treatments were conducted in the following procedures.

(a) Effect on Shay rat: Fasting (except water supply) Wister strain rats, male, weighed about 265 g. before experiment, were ligatured at connecting part of pylorus and duodenum under ether anesthesia according to the operation method of Shay et al. Immediately after the operation, drugs were administered. The animals were sacrificed after 18 hours standing with fasting and no water supply. The stomachs were enucleated and the volume of gastric juice and formation of peptic ulcers were observed macroscopically. Antiulcer activity was determined, principally by observing the changes of ulceration appearing on the rumen, by the following ulcer index. The ulcer index was determined in accordance with the multiplication of average degree of ulcer by percent ratio of ulcer formation.

The average degree of ulcer was designated as three degrees depending on the size of ulcer in the followings:

(Size of ulcer $>$- mm.) = Degree of ulcer 10 points.
(Size of ulcer $<$1 mm.) = Degree of ulcer 5 points.
Dotted = Degree of ulcer 1 point.

| Total points | Degree of ulcer |
|---|---|
| 0 | 0 |
| 1–9 | 1 |
| 10–19 | 2 |
| 20–29 | 3 |
| 30 | 4 |
| perforating ulcer and death | 5 |

Index of Ulcer (I.U.) = Average degre of Ulceration $\times$ percent ulceration.

The suppressed rate of ulcer is designated as;

$$\text{Suppressed rate} = \frac{\text{Control I.U.} - \text{Treated I.U.}}{\text{Control I.U.}} \times 100$$

At the same time, examinations of gastric juice, such as, the volume of gastric juice, pH of the gastric juice and peptic activity were performed.

Peptic activity was illustrated as: Tyrosine mg. formed/ml. of gastric juice.

TABLE 2

The antiulcerogenic activity of SAA-A1-219 substance on serotonin ulcer in rat

| Treatment | Dose (mg./kg.) | Number of animals | Body weight (g.) | Incidence of ulcer (percent) | Number of ulcer | Average degree of ulceration (=Ulcer Index) (mm.₂) | Preventive ratio (percent) |
|---|---|---|---|---|---|---|---|
| Control | | 10 | 109.8 | 100.0 | 5.7 | ª 9.50±1.35 | |
| SAA–A1–219 substance | 1,000 | 10 | 107.8 | 100.0 | 3.3 | * 2.41±0.76 | 64.11 |
| Aluminium sucrose polysulfate | 1,000 | 10 | 108.2 | 100.0 | 4.0 | * 6.84±1.17 | 28.00 |

ª Mean ± S.E.¹
* P <0.01. (Significantly different from control by t-test.)

NOTE.—Animal: Wistar-strain male rats. The test drugs were given orally at 3 hours before the subcutaneous administratin of 25 mg./kg. of serotonin creatinine sulfate.

TABLE 3

Effect of SAA-A1-219 substance on gastric ulceration by means of pylorus-ligation (18 hours) in rats

| Treatment | Dose (mg./kg.) | Number of animals | Body weight (g.) | Percent group ulceration | Average degree of ulceration | Ulcer Index | Suppressed rate (percent) |
|---|---|---|---|---|---|---|---|
| Control | | 10 | 257.1 | 100.0 | ª 4.20+0.39 | 4.20 | |
| SAA–A1–219 substance | 100 | 10 | 236.9 | 50.0 | *1.60+0.58 | 0.80 | 80.95 |
| Sucrose polysulfate aluminium compound | 100 | 10 | 241.6 | 60.0 | *2.10+0.64 | 1.26 | 70.00 |

ª Mean H S.E.
*P <0.01. (Significantly different from control by t-test.)

NOTE.—Animal: Wister-strain male rats. 48 hours fasting, 18 hours pylorus-ligated rats.

TABLE 4

The effect of SAA-A1-219 substance on gastric secretion in Shay rats (18 hours after operation)

| Compound | Dose (mg./kg.) | Number of animals | Body weight (g.) | Ulcer/number of rats/group | Gastric secretion | | | | Pepsin (as mg.) tyrosine |
|---|---|---|---|---|---|---|---|---|---|
| | | | | | Volume | | | pH | |
| | | | | | Ml./rat | Ml./kg. | Percent increase | | |
| Control | | 5 | 251.8 | 0/5 | 7.96 | ª 31.89 ±4.02 | | ª 1.18 ±0.02 | ª 11.64 ±0.41 |
| SAA–A1–219 substance | 00 | 5 | 256.6 | 0/5 | 10.24 | 39.77 ±5.92 | 24.7 | **2.18 ±0.17 | *9.13 ±1.08 |
| | 250 | 5 | 243.3 | 0/5 | 10.30 | 42.93±4.29 | 34.6 | 1.40±0.12 | **7.73±0.86 |

ª Mean ± S.E.
*P <0.05. (Significantly different from control.)
**P <0.01. (Significantly different from control.)

NOTE.—Animal: Wistar-strain male rats. 48 hours fasting, 8 hours pylorus-ligated rats.

(b) Effect on Serotonin ulcer: The drug was administered orally to 24 hours fasting rats, male, weighed 100–140 g. before experiment. After 3 hours 25 mg./kg. of 5-hydroxytryptophane were subcutaneously administered. After 18 hours, rats were sacrificed and 8 ml. of formalin was injected into stomach, thereafter incised and observed the inhibition of ulcer microscopically at ten magnifications.

Length on millimeter of injured part was measured and sum up the results per one rat to designate the Ulcer Index (U.I. value=mm².).

$$\text{Protective ratio} = \frac{\text{U.I. (control)} - \text{U.I. (treated)}}{\text{U.I. (control)}} \times 100$$

As hereinabove illustrated the disaccharide polysulfate ester hydroxyaluminium allantoinate-aluminium complex of the present invention has significant antiulcer activity against the experimental peptic ulcer.

The following examples illustrates the present invention but do not restrictively construe the scope of the invention.

EXAMPLE 1

Fifty grams of sucrose polysulfate ester calcium (sulfur content 19.7%) were dissolved in 200 ml. of water. To this solution 15 g. of chlorhydroxy aluminium allantoinate suspended in 150 ml. of water was added while violently stirring the mixture. 50 g. of aluminium hydroxychloride dissolved in 500 ml. of water were further added therein. After 1 hour the precipitated substance was collected by filtration, washed with water and methanol in this order and dried to obtain 81 g. of sucrose polysulfate ester hydroxyaluminium allantoinate-aluminium complex. Sulfur content; 9.8%, nitrogen content; 4.3% and aluminium content; 18.1%.

EXAMPLE 2

Fifty grams of maltose polysulfate ester sodium salt (sulfur content 18.6%) were suspended in 500 ml. of methanol. To this solution were added 20 g. of chlorhydroxy aluminium allantoinate suspended in 200 ml. of water with vigorous stirring. Further 60 g. of aluminium dihydroxychloride dissolved in 300 ml. of water were added thereto. The solution was adjusted to pH 4.3 with 5% sodium hydroxide solution. The precipitate was collected by filtration, washed with water and methanol in this order, then dried to obtain 85 g. of maltose polysulfate ester hydroxy aluminium allantoinate-aluminium complex. Sulfur content; 10.1%, aluminium content; 18.0% and nitrogen content; 4.5%.

EXAMPLE 3

Fifty grams of lactose polysulfate ester calcium salt (sulfur content 19.1%) were dissolved in 800 ml. of water. To this solution 15 g. of chlorhydroxy aluminium allantoinate and 50 g. of aluminium hydroxychloride were added in this order with violent stirring. The following were repeated using the same procedures as in Example 1 to obtain 79 g. of lactose polysulfate hydroxyaluminium allantoinate-aluminium complex. Sulfur content; 9.9%, aluminium content; 18.3% and nitrogen content 4.1%.

EXAMPLE 4

Fifty grams of sucrose polysulfate ester calcium salt (sulfur content 19.7%) were suspended in a mixed solution of 200 ml. of water and 200 ml. of methanol. To this suspension was added 15 g. of chlorhydroxy aluminium allantoinate suspended in 150 ml. of water with stirring violently. A solution of aluminum dihydroxychloride (60 g.) dissolved in 50 ml. of water was added thereto and the pH thereof was adjusted to 4.3 with 5% solution of sodium hydroxide. After 1 hour reaction, 500 ml. of methanol was added with stirring. The following procedures are the same as illustrated in Example 1 to obtain the product. Yield: 83 g. Sulfur content; 9.7%, aluminium content; 18.4% and nitrogen content; 4.1%.

What we claim is:

1. A disaccharide polysulfate ester hydroxyaluminium allantoinate-aluminium complex selected from the group consisting of sucrose polysulfate ester hydroxyaluminium allantoinate-aluminium complex, maltose polysulfate ester hydroxyaluminium allantoinate-aluminium complex and lactose polysulfate ester hydroxyaluminium allantoinate-aluminium complex.

2. A process for preparing a disaccharide polysulfate ester hydroxyaluminium allantoinate-aluminium complex selected from the group consisting of sucrose polysulfate ester hydroxyaluminium allantoinate-aluminium complex, maltose polysulfate ester hydroxyaluminium allantoinate-aluminium complex and lactose polysulfate ester hydroxyaluminium allantoinate-aluminium complex consisting essentially of reacting 1 mole of the appropriate disaccharide polysulfate ester alkaline metal salt or alkaline earth metal salt with 1 to 5 moles of chlorhydroxy aluminium allantoinate, and thereafter reacting the product with 2 to 5 moles of aluminium hydroxy chloride and 4 to 10 moles of aluminium dihydroxychloride at an ambient temperature in an aqueous medium.

3. A process to claim 2 wherein 1 mole of disaccharide polysulfate ester alkaline metal salt or alkaline earth metal salt is reacted with 1 to 2 moles of chlorhydroxy aluminium allantoinate and 4 to 10 moles of aluminium dihydroxychloride thereafter adjusting the pH at 4.0 to 4.5 by adding alkaline solution.

4. A process according to claim 2 wherein the reaction is performed in an aqueous medium consisting of water or aqueous methanol.

References Cited

UNITED STATES PATENTS

| | | | |
|---|---|---|---|
| 3,175,942 | 3/1965 | Anderson et al. | 260—234 R |
| 3,432,489 | 3/1969 | Nitta et al. | 260—234 R |
| 3,637,657 | 1/1972 | Morii et al. | 260—234 R |

260—209 R; 424—180

JOHNNIE R. BROWN, Primary Examiner

U.S. Cl. X.R.